Figure 1:
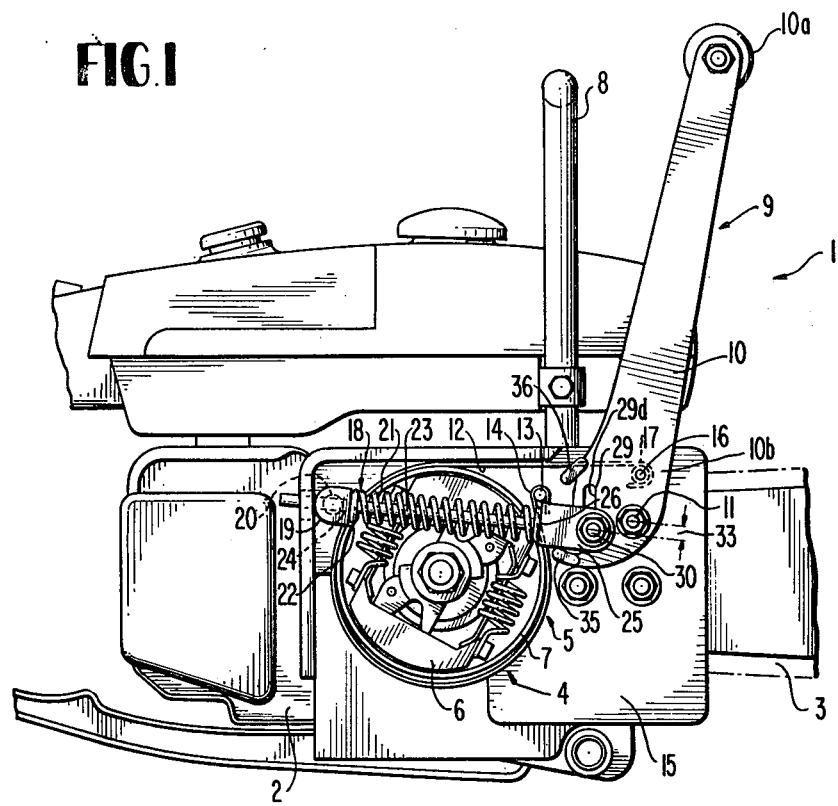

United States Patent [19]

Hirschkoff

[11] 4,026,392

[45] May 31, 1977

[54] SNAP-ACTING OVER-CENTER CHAIN SAW SAFETY BRAKE AND METHOD OF OPERATION THEREOF

[75] Inventor: Sidney Hirschkoff, Los Angeles, Calif.

[73] Assignee: McCulloch Corporation, Los Angeles, Calif.

[22] Filed: Jan. 20, 1976

[21] Appl. No.: 650,733

Related U.S. Application Data

[62] Division of Ser. No. 515,046, Oct. 15, 1974, Pat. No. 3,934,345.

[52] U.S. Cl. ............................. 188/166; 30/381; 74/97; 188/77 R; 192/80; 192/89 R
[51] Int. Cl.² ...................................... B60T 13/04
[58] Field of Search ............... 188/166, 167, 77 R; 192/80, 89 R; 74/97; 30/381, 383

[56] References Cited

UNITED STATES PATENTS

| | | | |
|---|---|---|---|
| 1,393,111 | 10/1921 | Getchell | 74/97 X |
| 2,621,538 | 12/1952 | Bechman et al. | 74/97 X |
| 2,900,970 | 8/1959 | Sims et al. | 74/97 X |
| 3,213,707 | 10/1965 | McCann et al. | 188/77 R X |
| 3,776,331 | 12/1973 | Gustafsson | 30/381 X |
| 3,923,126 | 12/1975 | Bidanset | 30/381 X |

*Primary Examiner*—George E. A. Halvosa
*Attorney, Agent, or Firm*—Burns, Doane, Swecker & Mathis

[57] ABSTRACT

A chain saw safety brake including a snap-acting, over-center actuating mechanism.

A chain saw safety brake and method of operation characterized by an actuation accelerator interposed between a brake mechanism and a brake actuating mechanism. A biasing means is operable to bias the brake actuating means toward a nonactuating position with a relatively lower biasing force. The biasing means is operable to bias the brake actuating means toward an actuating position with a relatively higher biasing force.

12 Claims, 7 Drawing Figures

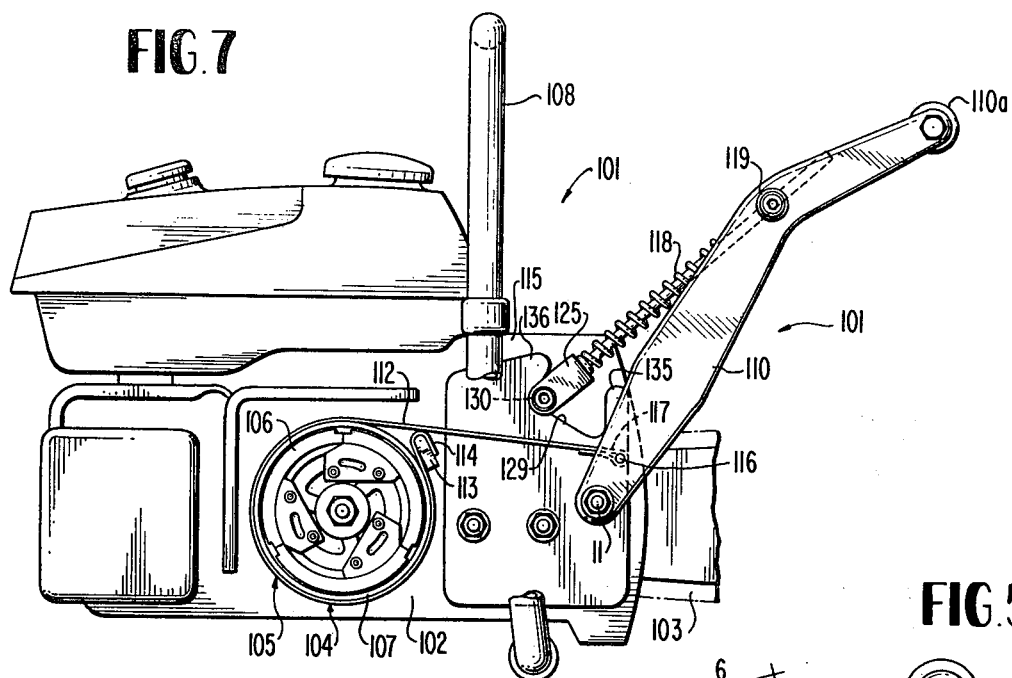
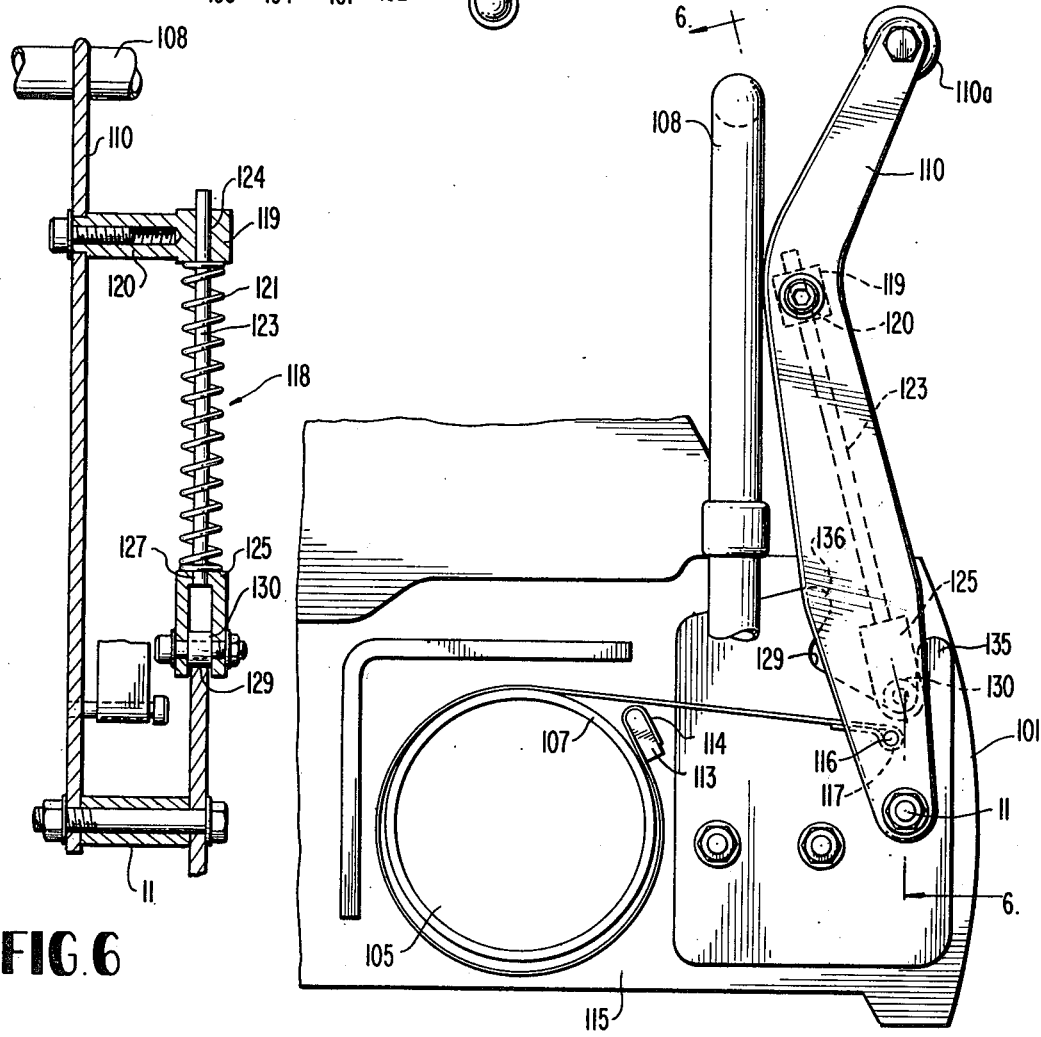

SNAP-ACTING OVER-CENTER CHAIN SAW SAFETY BRAKE AND METHOD OF OPERATION THEREOF

This is a division, of application Ser. No. 515,046, filed Oct. 15, 1974, now U.S. Pat. No. 3,934,345.

GENERAL BACKGROUND, OBJECTS AND SUMMARY OF INVENTION

With continuing emphasis being placed upon the improvement of saftey conditions in relation to the use of chain saws, it has become increasingly important to protect chain saw operators from injuries resulting from "kickbacks" chain saws or from situations where operators losing their grip on chain saw handles such that their hands are brought into engagement with chain saw cutter chains.

Several techniques have been developed in the past in an endeavor to improve chain saw safety and protect operators from injuries when events such as this occur.

All this notwithstanding, there has persisted in the art a need to improve the efficiency and reliability of such safety mechanisms.

Accordingly, it is a specific object of the present invention to provide a chain saw safety brake which is snap-acting and operated via an accelerating mechanism so as to produce a cutter chain braking action in an extremely rapid manner.

It is a further object of the present invention to accomplish such a rapidity of breaking with a minimized movement of an actuating member or safety handle.

Yet another object of the invention is to provide a chain saw safety brake actuating mechanism wherein an intensified biasing force is created when the actuating mechanism is moved to a brake actuating position.

It is likewise an object of the invention to provide such improvements in the art as heretofore described concurrent with the attainment of relative structural simplicity and reliability and the minimizaton of alterations to conventional chain saw structures. In accomplishing at least some of these objectives, the present invention contemplates a method of actuating a chin saw safety brake which is characterized as follows.

The method of this invention involves the safety braking of a chain saw which includes brake means and brake actuating means movably engaged with said brake means. The inventive method entails:

operably interposing actuation accelerator means between the brake actuating means and the brake means and employing the accelerator means to effect a faster rate of brake actuation than would result from said movable engagement between the brake actuating means and the brake means;

biasing the brake actuating means toward a nonactuating position with a relatively lower biasing force; and biasing the brake actuating means toward an actuating position with a relatively higher biasing force.

Likewise, the invention contemplates unique combinations of apparatus means which coact to effect the method steps heretofore described.

Moreover, the invention herein presented contemplates a variety of structural embodiments characterized by a resiliently biased, snap-acting, over-center actuating mechanism.

In describing the invention, reference will be made to these presently preferred embodiments by way of example and with reference to appended drawings. However, it will be understood that the reference to preferred embodiments will be by way of example only and not by way of restricting the scope of the present invention.

DRAWINGS

Figure 2:
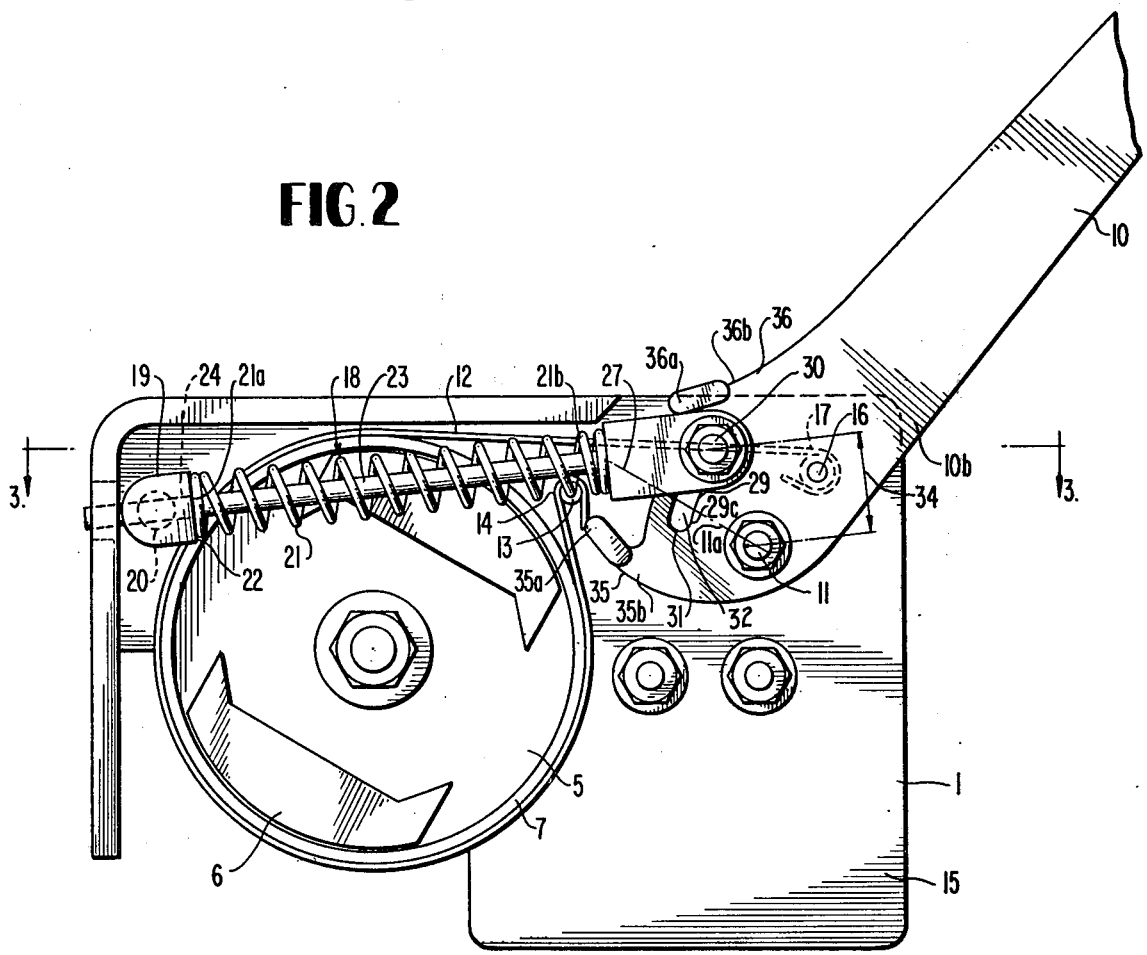
Figure 3:
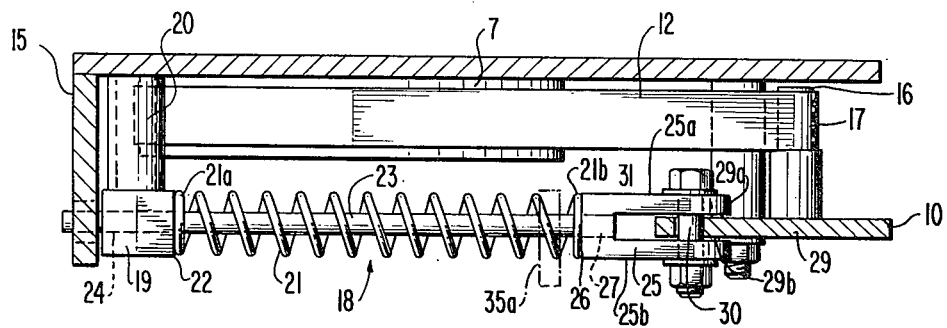
Figure 4:
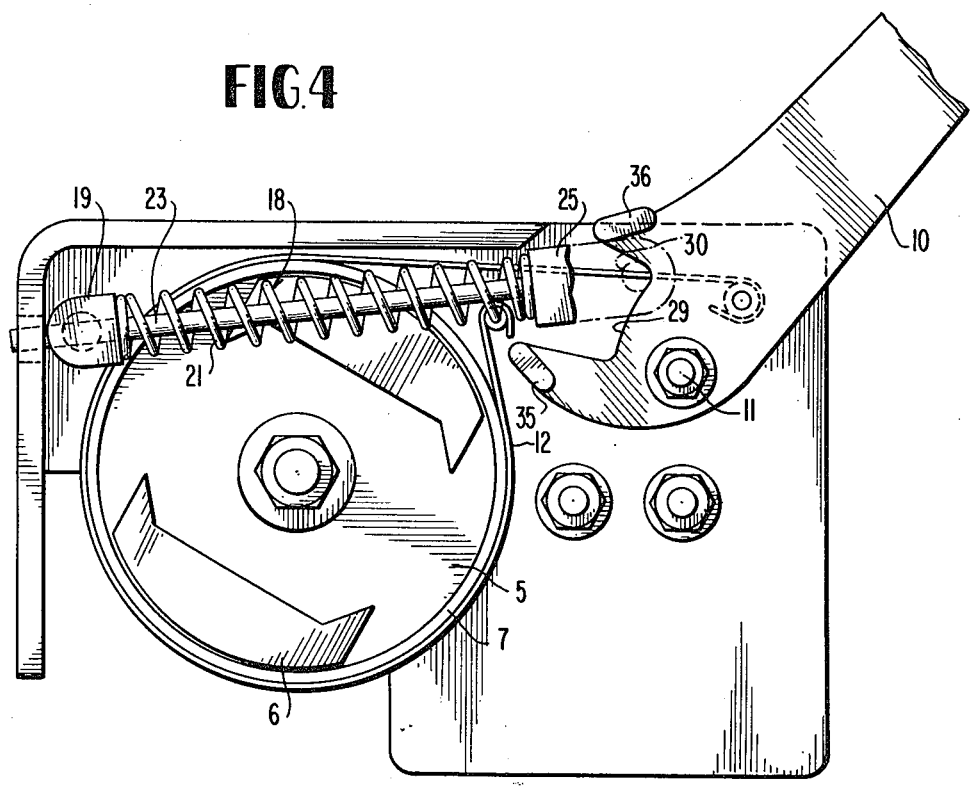

Presently preferred embodiments of the invention are illustrated in the appended drawings. In these drawings FIG. 1 provides a fragmentary, partial elevational view of that portion of a chain saw immediately associated with the safety brake mechanism of the present invention and showing the chain saw in a non-braked condition;

FIG. 2 provides an enlarged fragmentary elevational view of the safety brake mechanism featured in FIG. 1, but illustrating the chain saw in a braked condition;

FIG. 3 provides a sectional view of the FIG. 1 safety mechanism as viewed along the section line 3—3 of the FIG. 2, brake actuated condition;

FIG. 4 schematically illustrates a somewhat modified form of safety brake mechanism which is illustrated in FIGS. 1—3, illustrating the modified form in an actuated or braked condition;

FIG. 5 provides a fragmentary, elevational view of a chain saw portion, generally related to that shown in FIG. 2, but depicting a still further alternative format of the present chain saw braking concept, with this alternative structure being depicted in a non-braking condition;

FIG. 6 provides a sectional view of the FIG. 5 embodiment as viewed along section line 6—6 of FIGS. 5; and FIG. 7 depicts the FIG. 5 safety brake in the context of the chain saw portion as generally shown in FIG. 1, depicting this format somewhat schematically, illustrating a chain saw centrifugal clutch different than that incorporated in FIG. 1, and depicting the FIG. 5 chain saw in an actuated or braked condition.

With the content of the drawings having been generally described, it now becomes appropriate to consider individual structural details of the invention.

GENERAL DESCRIPTION OF INVENTION

In describing the chain saw safety brake of the present invention, reference will first be made to exemplary embodiments, showing by way of example only, representative chain saws and chain saw drive mechanisms with which the present invention is intended to be practiced.

OVERALL CHAIN SAW STRUCTURE

FIGS. 1 and 7 each illustrate representative chain saw structures with which the present invention is intended to be practiced.

FIG. 1 depicts a chain saw 1 generally as shown in U.S. Fredrickson Pat. No. 3,542,095, issued Nov. 24, 1970, the disclosure of which is herein incorporated by reference. Chain saw 1 includes chain saw engine means 2 and chain saw cutter chain means 3.

Chain saw 1 further includes chain saw driving means 4 which is operable to provide a driving connection between the chain saw engine means 2 and the chain saw cutter means 3.

The chain saw driving means 4 may include a centrifugal clutch 5, generally as depicted in U.S. Collins Pat.

No. 3,385,411 issued May 28, 1963, the disclosure of which is herein incorporated by reference.

Clutch 5 includes centrifugally responsive, clutch shoe means 6 operable to be driven by the engine means 2, and clutch drum means 7 drivingly connected with the chain saw cutter chain 5 means and operable to be centrifugally engaged by the clutch shoe means 6.

Saw 1 additionally inches chain saw hand grip means 8 which may be generally like the hand grip means featured in Frederickson U.S. Pat. No. 3,542,095 or modified somewhat, as shown in FIG. 1, to omit side portion 39 of the Frederickson handle. The FIG. 7 chain saw corresponds generally to that shown in FIG. 1 and its basic components have been assigned reference numerals equivalent to those in FIG. 1, but increased by 100.

However, by way of example, it will be noted that the FIG. 7 chain saw 101 may include a hand grip means 108 corresponding generally to that generally depicted in U.S. Loop Pat. No. 3,678,973, the disclosure of which is herein incorporated by reference.

Moreover, chain saw 101 may include a centrifugal clutch 105 generally as shown in U.S. Frederickson Pat. No. 3,768,611, the disclosure of which is herein incorporated by reference.

For definitional purposes, the term "chain saw" will be used to define a chain saw structure independent of the chain saw safety brake of the present invention.

With the chain saw context of the invention having been discussed, by way of example only, it now becomes appropriate to consider structural and method aspects of the present safety brake invention.

CHAIN SAW SAFETY BRAKE — FIRST EMBODIMENT

A first preferred embodiment of the invention is illustrated in FIG. 1 through 3.

As shown in FIGS. 1 to 3, chain saw 1 is associated with a chain saw safety brake 9.

Brake 9 includes handle means 10, generally as depicted in U.S. Dooley Pat. No. 3,839,795 issued Oct. 8, 1974 the disclosure of which is herein incorporated by reference.

Safety handle means 10 is operable to be engaged at transverse portion 10a by movement of a chain saw operator's hand away from the chain saw hand grip means 8 during a "kickback" or when the operator's hand slips off of hand grip 8 and moves toward cutter chain 3.

A pivot means 11 pivotally supports the safety handle means 9 on the chain saw 1.

Brake 9 includes a brake band means 12 which at least partially encircles clutch drum means 7 as shown in FIG. 1. Band 12, which may be fabricated of a spring steel band, is operable to be disposed in a first, relatively expanded, brake band condition shown in FIG. 1 permitting chain driving rotary movement of the clutch drum 7, and a second, relatively constricted, brake band condition shown in FIG. 2 engaging and substantially preventing movement of the clutch drum 7.

An anchor means or pin mounting 13 is connecting with one hooked end 14 of the brake band 12 and secures this one end 14 of the brake band to the engine housing 15 of the chain saw 1.

A connecting means or other pin mounting 16 secures another end 17 of the brake band 12 to a portion 10b of the safety handle 10, which portion 10b is spaced from the safety handle pivot 11a. With this arrangement, movement of the safety handle 10 away from the hand grip means 8, and the first safety handle means position depicted in FIG. 1 providing the first, relatively expanded brake band condition, will move the connecting means 16 relative to the anchor 13 means and position the safety handle 10 at a second safety handle means position depicted in FIG. 2 so as to constrict or tighten the brake band 12 about clutch drum 7 and dispose the brake band 12 in a second, relatively constricted, condition shown in FIG. 2.

Brake means 9 further includes a resilient biasing means 18 comprising a first, block-like mounting means 19 which is pivotally secured by pivot mount 20 to the engine housing 15 of chain saw 1, a coil spring 21 which has one end 21a which engages one end 22 of the first mounting means 19, a guide rod 23 which extends telescopingly through the coil spring 21 and a passage 24 of the first mounting means 19, and a second, clevis-like mounting means 25 biasingly engaged at end 26 by another end 21b of the coil spring 21 and connected with the guide rod 23 by rod connection 27.

An over-center connecting means operably interconnects the biasing means 18 and the safety handle 10 and includes a cam surface 29 carried by the safety handle 10 and extending transversley of a radius 11a of the safety handle pivot 11 on opposite sides of this radius, and a rod-like, bearing or cam follower means 30 carried by the legs 25a and 25b of the second mounting means 25 and disposed in sliding engagement with the cam surface 29, with the coil spring 21 biasingly urging the cam follower 30 into sliding engagement with the cam surface 29 and the legs 25a and 25b being movably disposed adjacent opposite edges 29a and 29b of the cam surface 29.

As shown in FIG. 2, the cam surface 29 may comprise a somewhat convex surface carried by the safety handle 10, disposed in alignment with a plane extending longitudinally of the chain saw, 1, and curving about pivot axis 11.

As is further shown in FIG. 2, the safety brake additionally includes a cam follower retaining means 31 which cooperates with the cam surface 29 to define a movement restricting enclosure, or slot 32 constraining said cam follower 30.

The cam follower 30, when engaged with a first portion 29c of the cam surface 29 depicted in FIG. 2 which is located on one side of the radius 11a, as shown in FIG. 1, is operable to resiliently bias the safety handle 10 towards the hand grip 8 and the first safety handle means position effecting the first, relatively expanded condition of said brake band means. In this "cocked" condition, the chain saw brake is disposed for normal chain saw operaton.

The cam follower 30, when engaged with a second portion 29d depicted in FIG. 1 of the cam surface 29 on another side of the radius 11a, as shown in FIG. 2, is operable to resiliently bias the safety handle 10 toward the second safety handle means position effecting the second, relatively constricted condition of said brake band means. In this condition, effected by an operator's hand leaving grip 8 and engaging handle portion 10a so as to push handle 10 toward the cutter chain 3, the clutch drum 7 and cutter chain 3 are braked.

As will now be appreciated, the cooperation between braking means 18 and safety handle 10 affords a resiliently biased, snap-acting, over-center mode of movement of handle 10 between the FIG. 1 "cocked" and FIG. 2 "braked" positions and vice versa.

The biasing means 18 cooperates with the safety handle 10, in the first, safety handle means position of engagement between said cam follower 30 and the cam surface means 29 shown in FIG. 1, to provide a relatively shorter lever arm 33 through which the biasing means 18 acts resiliently on the safety handle 10 to resiliently bias this safety handle 10 toward the hand grip 8 and the first, safety handle means position of FIG. 1. This means that "recocking" of the safety handle 10 from the FIG. 2 to the FIG. 1 position may be relatively easily effected.

The biasing means 18 cooperates with the safety handle 10, in the second, safety handle means position of engagement between said cam follower 30 and the cam surface 29, to provide a relatively longer lever arm 34 through which the biasing means 18 acts resiliently on the safety handle 10 to resiliently bias this safety handle 10 away from the hand grip 8 and toward the second, safety handle means position of FIG. 2. This means that an intensified brake setting force will result when an operator's hand moves handle 10 to the brake setting position of FIG.2.

A first, accelerator lever means 35 is carried by the safety handle 10 and comprises a lug-like plate 35a carried by lever arm 35b as to be engageable with the bottom side of clevis 25. Plate 35a may have a width straddling clevis 25, as shown in phantom line in FIG. 3. Lever 35 is disposed on the bottom side of radius 11a and the second mounting means or clevis 25 and is operable to engage the bottom side of clevis 25 at a location spaced radially outward from the cam follower 30 in relation to pivot axis 11. The first accelerator lever means 35 is thus operable to induce conterclockwise movement of the cam follower 30 (as shown in FIG. 1) relative to the cam surface 29, toward said second portion 29d of the cam surface 29 in response to clockwise pivoting movement (as shown in the drawings) of the safety handle 10 toward the second safety handle means position of FIG. 2 at a faster rate than would result only or merely from direct sliding engagement of the cam follower 30 and the cam surface 29 during such pivoting movement. This means that an accelerated, over-center, snap-acting cooperation between biasing means 18 and actuating handle 10 will occur when an operator's hand pushes on handle portion 10a and effect very rapid brake setting movement of handle 10 with less handle movement than would be otherwise required.

A second, accelerator lever means 36 is carried by the safety handle 10 and includes a clevis engaging plate 36a and a lever arm 36b essentially like those of lever means 35. However, lever 36 is disposed on the top side of the radius 11 and the second mounting means or clevis 25 and is operable to engage the top side of the clevis 25 at a location spaced radially outward from the cam follower 30, in relation to pivot 11. The second accelertor lever 36 is operable to induce clockwise movement of cam follower 30 (as shown in FIG. 2) relative to the cam surface 29 toward the first portion 29c of the cam surface 29 in response to counterclockwise, handle recocking, pivoting movement of safety handle 10 toward the first safety handle means position of FIG. 1 at a faster rate than would result only or merely from direct engagement of the cam follower 30 and the cam surface 29 during such pivoting, recocking movement. This means that an accelerated recocking of handle 10 may be effected, with counterclockwise recocking force being exerted on handle 10 for a shorter increment of handle movement than would otherwise be required.

CHAIN SAW SAFETY BRAKE — SECOND EMBODIMENT

A second embodiment of the chain saw safety brake of the present invention comprising a somewhat modified form of the FIG. 1 —3 embodiment is illustrated in FIG. 4.

The FIG. 4 embodiment is substantially identical to the FIG. 1 -3 embodiment except that the retaining means 31 is omitted. In other words, cam surface 29 is "open" rather than "enclosed".

CHAIN SAW SAFETY BRAKE — THIRD EMBODIMENT

The first and second chain saw safety brake embodiments were characterized by arrangements where the actuating cam surface is carried by the safety handle and the first mounting means 19 of the biasing means 18 is connected with the chain saw engine housing 15. In these embodiments, the biasing means may extend along the side of the chain saw, generally across the chain saw centrifugal clutch 5, as depicted in FIGS. 1 through 4.

In a third embodiment of the present invention, depicted generally in FIGS. 5 -7, the biasing means extends upwardly generally along the chain saw hand grip means and the safety handle. In this third embodiment, the cam surface means is mounted on the engine housing while the first mounting means of the biasing means is carried by the safety handle.

As will be recalled, components of the FIG. 5 -7 embodiment are identified by reference numerals corresponding to equivalent components of the FIG. 1 -4 embodiments, increased by 100.

Inasmuch as the mode of cooperation between the components of the FIG. 5 -7 embodiment is substantially the same as the mode of cooperation between the FIG. 1 -4 embodiment's components, and this is self-evident from the drawings, it is not deemed necessary to reiterate structural details in relation to FIGS. 5 -7.

Suffice it to say that in FIG. 5 -7, the cam surface 129 is carried by the engine housing 115 of chain saw 101 and the first mounting means 119 is pivotally secured by pivot 120 to safety handle 110.

Moreover, instead of the accelerating lever means 135 and 136 being disposed above and below the clevis 125 as in the case of the disposition of elements 35, 36 and 25, lever means 135 is disposed to the right side of clevis 125, with lever means 136 being disposed on the left side, as illustrated in FIGS. 5 -7.

It might also be noted that the extremity of the "cocked" position of handle 10, as depicted in FIG. 1, may be determined by the biasing force of spring 21 or by engagement of handle 10 with suitable stop means carried by the chain saw body or hand grip means. In the FIGS. 5 -7 embodiment, this "cocked" position extremity is defined by engagement of handle 110 with hand grip 108, as depicted in FIGS. 5 and 6.

SUMMARY OF ACTUATION CHARACTERISTICS

As will now be apparent, this invention is concerned with a method of safety-braking a chain saw, wherein the chain saw includes brake means and brake actuating means movably engaged with said brake means.

Characterizing features of the invention involve:
operably interposing actuation accelertor means, such as the described accelerating lever means, between the brake actuating means and the brake means and employing such accelerator means to effect a faster rate of brake actuation than would result from said movable engagement between said brake actuating means and said brake means alone;
biasing the brake actuating means toward a nonactuating position with a relatively lower biasing force; and
biasing the brake actuating means toward an actuating position with a relatively higher biasing force.

The invention is also independently characterized by an over-center, snap-acting, cocking and braking mechanism.

SUMMARY OF MAJOR ADVANTAGES AND GENERAL SCOPE OF INVENTION

The resiliently biased, snap-acting, over-center actuating mechanism described in connection with each of the three embodiments set forth in this application produces several unique advantages.

In the first instance, it will be noted that the lever means associated with the cam surface means causes the cam follower means to translate along the cam surface means faster than this movement would occur if the lever means were not present. This insures unusually rapid or accelerated brake setting when the safety handle is tripped or engaged by an operator's hand and further insures brake actuating and handle cocking movement in response to relatively short increments of movement of the safety handle.

Moreover, the unique, over-center character of the actuating mechanism produces a longer lever arm through which biasing force is exerted on the safety handle when the handle is moved toward the brake actuating position. This phenomenon produces an intensified braking force. The itensified braking force in conjunction with the accelerated braking action is believed to materially improve the rapidity and efficiency of stopping of the cutter chain of the chain saw so as to enchance overall safety conditions.

Independent of these particular and significant advantages, it is believed that the structural arrangements heretofore described are also characterized by unique simplicity, ruggedness, and reliability. It will also be appreciated that these arrangements enable safety brake mechanisms to be installed with minimal modifications of conventional chain saw structures and without interfering with conventional drive chain arrangements.

Proposals have been heretofore offered which have significantly advanced the state of chain saw safety. These proposals arc disclosed in Moore United States application Ser. No. 109,574, now U.S. Pat. No. 3,739,475, issued June 19, 1973; Moore United States application Ser. No. 294,366, now U.S. Pat. No. 3,793,727, issued Feb. 26, 1974; and Dooley United States application Ser. No. 354,776, now U.S. Pat. No. 3,839,795, issued Oct. 8, 1974, all assigned to the assignee of the present invention.

Other chain saw safety proposals have been profferred as can be seen, for example, in Gustafsson U.S. Pat. No. 3,776,331, issued Dec. 4, 1973; Mattsson et al U.S. Pat. No. 3,664,390, issued May 23, 1972; Irgens U.S. Pat. No. 3,361,165, issued Jan. 2, 1965; Kiekhaefer U.S. Pat. No. 2,610,657, issued Sept. 16, 1952; and British Pat. No. 1,351,546, published May 1, 1974.

These prior art concepts notwithstanding, the accelerated and intensified braking characteristics of the present invention are considered to constitute a noel, unobvious, and advantageous advance in the chain saw art.

Those skilled in the chain saw art and familiar with the present disclosure may well envision alternative arrangements in addition to those described and will recognize that the invention may be practiced in a variety of structural formats and in connection with a substantial variety of chain saws and chain saw drive mechanisms and chain saw brake mechanisms, in addition to those illustrated. In short, while additions, deletions, substitutions or modifications in relation to the disclosed embodiments may be effective in practicing the invention, such changes would be deemed to fall within the purview of the present invention to the extent encompassed by the appended claims.

What is claimed is:

1. A chain saw safety brake comprising:
brake means including a brake element and spring biasing means;
brake actuating means directly movably engaged with said brake means; and
actuation accelerator means operably interposed between said brake actuating means and said brake means and operable to effect a faster rate of brake actuation than would result from said movable engagement between said brake actuating means and said brake means;
said spring biasing means being operable to
bias said brake actuating means toward a nonactuating position with a first biasing force, and
bias said brake actuating means toward an actuating position with a second biasing force which is higher than said first biasing force.

2. In a method of safety-braking a chain saw, wherein said chain saw includes
brake means including a brake element and spring biasing means, and
brake actuating means directly movably engaged with said brake means,
the improvement comprising:
operably interposing actuation accelerator means between said brake actuating means and said brake means and employing said accelerator means to effect a faster rate of brake actuation than would result from said movable engagement between said brake actuating means and said brake means;
biasing said brake actuating means toward a nonactuating position with a first biasing force; and
biasing said brake actuating means toward an actuating position with a second biasing force that is higher than said first biasing force.

3. A chain saw safety brake comprising:
brake means;
brake activating means, including biasing means for activating said brake means, said brake activating means being movable from a first position in which said biasing resists activation of said brake means, to a second position in which said biasing means activates said brake means;

handle means movable to a brake actuating position and including:

first surface means engageable with aid brake activating means at a first location thereof for shifting said brake activating means from its first position to its second position in response to movement of said handle means to its brake actuating position; and accelerator surface means engageable with said brake activating means at a second location thereof for shifting said brake activating means from its first position to its second position in response to movement of said handle means toward a brake actuating means, at a faster rate than that produced by said first surface;

said brake activating means being arranged so that in said second position thereof said biasing means activates said brake means with a force that is greater than the force with which it resists activation when said brake activating means is in said first position.

4. A safety brake according to claim 3 wherein said brake activating means includes a guide rod, and said biasing means includes a spring biasing said guide rod against said first surface.

5. A safety brake according to claim 3 wherein said brake activating means includes a cam follower, said first surface means comprises a cam surface whose orientation is altered by movement of said handle means, and said accelerator surface means comprises a lug carried by said handle means.

6. A safety brake according to claim 5 wherein said handle means is mounted for pivotal movement about a pivot axis, said lug being spaced a greater distance from said axis than the spacing between said cam surface and said pivot axis when said handle means is out of said actuating position.

7. A safety brake according to claim 3 wherein said first surface means is operable to shift said brake activating means to said first position in response to movement of said handle means from said brake actuating position, said handle means further including third surface means engageable with said brake activating means at a third location thereof for shifing said brake activating means from said second to said first position in response to movement of said handle means from said brake actuating position, at a faster rate than that produced by said first surface.

8. A chain saw safety brake comprising:

a housing;

brake means;

brake activating means, including biasing means, for activating said brake means, said brake activating means being movable from a first position in which said biasing means resists activation of said brake means, to a second position in which said biasing means activates said brake means;

handle means movable to a brake actuating position and operably connected to said brake actuating means to alter the orientation thereof in response to movement of said handle means to said brake actuating position;

said housing including:

a first surface engageable with said brake activating means at a first location thereof to cause shifting of said brake activating means from its first position to its second position in reponse to movement of said handle means to its brake actuating position; and an accelerator surface engageable with said brake activating means at a second location thereof to cause shifting of said brake activating means from its first position to its second position in response to movement of said handle means toward a brake actuating means, at a faster rate than that produced by said first surface;

said brake activating means being arranged so that in said second position thereof said biasing means activates said brake means with a force that is greater than the force with which it resists activation when said brake activating means is in said first position.

9. A safety brake according to claim 8 wherein said brake activating means includes a guide rod and said biasing means includes a spring biasing said guide rod against said first surface.

10. A safety brake according to claim 9 wherein said brake activating means includes a cam follower, said first surface comprises a cam surface, said guide rod having it orientation altered in response to movement of said handle means to enable said cam surface to cause shifting of said cam follower under the urging of said spring, said accelerator surface means comprising a lug carried by said housing.

11. A safety brake according to claim 10 wherein said handle means is mounted for pivotal movement about a pivot axis, said lug being spaced a greater distance from said axis than the spacing between said first suface and said pivot axis when said handle means is out of said actuating position.

12. A safety brake according to claim 8 wherein said first surface is operable to shift said brake activating means to said first position in response to movement of said handle means from said brake actuating position, said housing further including third surface means engageable with said brake activating means at a third location thereof for causing shifting of said brake activating means from said second to said first position in response to movement of said handle means from said brake actuating position, at a faster rate than that produced by said first surface.

* * * * *